(12) United States Patent
Martin

(10) Patent No.: US 6,564,269 B1
(45) Date of Patent: May 13, 2003

(54) BI-DIRECTIONAL DATA TRANSFER USING THE VIDEO BLANKING PERIOD IN A DIGITAL DATA STREAM

(75) Inventor: Russel A. Martin, Menlo Park, CA (US)

(73) Assignee: Silicon Image, Inc., Cupertino, CA (US)

( * ) Notice: Subject to any disclaimer, the term of this patent is extended or adjusted under 35 U.S.C. 154(b) by 0 days.

(21) Appl. No.: 09/392,229

(22) Filed: Sep. 8, 1999

Related U.S. Application Data
(60) Provisional application No. 60/099,821, filed on Sep. 10, 1998.

(51) Int. Cl.[7] ............................................. G06F 13/00
(52) U.S. Cl. .......................... 710/20; 710/14; 710/31; 710/33; 710/38
(58) Field of Search ............................ 710/14, 33, 31, 710/38

(56) References Cited

U.S. PATENT DOCUMENTS

| | | | | |
|---|---|---|---|---|
| 4,414,626 A | * | 11/1983 | Arai et al. ................. | 710/34 |
| 5,097,410 A | * | 3/1992 | Hester et al. ............... | 710/31 |
| 5,457,473 A | | 10/1995 | Arai et al. ................. | 345/10 |
| 5,675,813 A | | 10/1997 | Holmdahl .................. | 395/750 |
| 5,781,028 A | | 7/1998 | Decuir ..................... | 326/30 |
| 5,796,269 A | * | 8/1998 | New ....................... | 326/40 |
| 5,954,813 A | * | 9/1999 | Mann et al. ................ | 712/43 |

FOREIGN PATENT DOCUMENTS

| | | |
|---|---|---|
| EP | 0692760 A2 | 1/1996 |
| JP | 10116139 | 6/1998 |
| WO | WO 93/06587 | 4/1993 |

* cited by examiner

Primary Examiner—Jeffrey Gaffin
Assistant Examiner—Mohammad Farooq
(74) Attorney, Agent, or Firm—Perkins Coie LLP

(57) ABSTRACT

Digital pixel data is transferred from a computer system to video display hardware in a forward direction. However, there are many reasons for digital pixel data to be transferred in both directions along a cable connecting a computer and a monitor. This invention describes a method of sending digital data from a monitor back to the computer in a reverse direction. In transmission of digital pixel data in a forward direction, there are horizontal and vertical blanking periods during which special characters are transmitted in order to resynchronize the digital pixel data to a clock signal. In such a system the transmission of these special characters only requires a portion of the blanking periods. During the remainder to the blanking period, some of or all of the data paths can be used in order to transmit digital data in a reverse direction. Where all data paths are used, the beginning and end of the usable portion of the blanking periods may last for a fixed number of clock cycles. Alternatively, the beginning and end of the usable portion of the blanking periods may be indicated by signals transmitted in a forward direction over one of the data paths, where all data paths are not used in a reverse direction.

23 Claims, 8 Drawing Sheets

BI-DIRECTIONAL DATA TRANSFER USING THE VIDEO BLANKING PERIOD IN A DIGITAL DATA STREAM

RELATED APPLICATION

The application claims the benefit of U.S. Provisional Application No. 60/099,821, filed Sep. 10, 1998.

BACKGROUND OF THE INVENTION

Most computer systems consist of a processor unit and a number of peripheral devices coupled to the processor unit. The peripheral devices send and receive information to and from the processor and, typically, each peripheral device is separately connected to the processor unit by an individual set of cables, with each set of cables having a number of wires. The wires may be used for transferring information from the processor unit to the peripheral, as in the case of digital pixel data transferred to an active matrix flat panel display; or, the wires may used for transferring digital information from the peripherals to the processor unit, as in the case of digital data transferred from a keyboard or mouse to the processor unit. The information may be transferred serially or in parallel, depending upon the number of wires and the communications protocol used to transmit the information.

FIG. 1 illustrates a conventional computer system 100 having a processor unit 101 and a number of peripherals coupled to the processor. The peripherals include a keyboard 102, a mouse 103, a display 104, a digital camera 105, and a pair of speakers 106a and 106b. As shown in FIG. 1, each of the peripherals is coupled to the processor unit through an individual cable assembly. Accordingly, the display 104 is coupled to the processor 101 through cable assembly 110, the keyboard 102 is coupled to the processor 101 through cable assembly 111, the mouse 103 is coupled to the processor 101 through cable assembly 112, the digital camera 105 is coupled to the processor 101 through cable assembly 114, and the pair of speakers 106a and 106b are coupled to the processor 101 through cable assemblies 115a and 115b. Each cable assembly may require a number of wires for communicating information back and forth between the processor 101 and the particular peripheral. As can be seen from FIG. 1, this conventional computer system 100 requires a large number of wires to be coupled directly to the processor 101. This configuration is undesirable for a myriad of reasons, which should be obvious to one of ordinary skill in the art.

In order to reduce the number of wires that the user must connect to a processor unit, information may be sent to and from a hub system over a limited number of wires coupled between the processor and the hub system, where the information is then routed to the proper peripheral. The hub system may be designed as a stand alone device or it may, preferably, be implemented within one of the peripherals, with each of the other peripherals being coupled thereto. FIG. 2 illustrates a computer system 200 having a hub system 201 coupled to a processor unit 202. In the prior art embodiment illustrated in FIG. 2, the hub system 201 is implemented within a display 203 and is fully integrated within the display 203. Additional peripherals, such as a keyboard 204, a mouse 205, a digital camera 206 and a pair of speakers 207a and 207b are each coupled to the hub system 201. The hub system 201 acts as a pass through port or routing system and routes information between each of the peripherals and the processor unit 202.

As shown in FIG. 2, the processor unit 202 and the hub system 201 are coupled together by two different cable assemblies 210a and 210b. Preferably, one of the cable assemblies 210a is used for transferring digital pixel data to the display 203 in a first direction; and, the other cable assembly 210b is used for communicating serial digital data back and forth between the processor unit 202 and each of the other peripherals coupled to the hub system 201. Each cable assembly has a limited number of wires, such that this configuration is preferable over the prior art system illustrated in FIG. 1. In a conventional computer system, cable assembly 210a may be configured to transmit digital pixel data to display 203 using any one of several applicable transmission protocols such as TDMS (Transition Minimized Differential Sensing), LVDS (Low Voltage Differential Sensing), or analog RGB communications. Cable assembly 210b may be configured to transmit digital data using any applicable digital communications protocol such as the USB (Universal Serial Bus) standards.

Digital pixel data intended to be displayed by display 203 is received over the first cable assembly 210a, retained, and properly processed for display by the display 203. The serial digital data intended for any of the other peripherals is received over the second cable assembly 210b, passed through the hub system 201, and routed to the proper peripheral. Accordingly, each of the other peripherals sends information to the processor unit 202 or receives information from the processor unit 202 through the hub system 201 over cable assembly 210b; while the display 203 receives digital pixel data over cable assembly 210a.

In a computer system wherein TDMS communications are used for transferring digital pixel data, cable assembly 210a will include four twisted wire differential pairs. Alternatively, in a computer system in which LVDS communications are used for transferring digital pixel data, cable assembly 210a will include five twisted wire differential pairs. In TDMS communications, one twisted wire differential pair is used for each of the primary red, green and blue digital pixel data streams and the fourth twisted wire differential pair is used for transmitting a clock signal. Systems which use LVDS communications transmit digital pixel data over four dual wire pairs, with a fifth dual wire pair used for transmitting a clock signal. Twenty four bits of the digital red, green blue pixel data are transmitted over four dual wire pairs with six bits per dual wire pair in order to achieve a high transmission rate. Both TMDS and LVDS communications require a horizontal video blanking period between the transmission of digital pixel data for each line in a display, and a vertical blanking period between the transmission of each frame to be displayed.

FIG. 3 further illustrates the communication of digital pixel data over cable assembly 210a between processing unit 202 and display 203 in a computer system which utilizes TDMS communications. As shown, a transmitter 301 is implemented within the processor 202 for transmitting digital pixel data from the processor 202 to the display 203. A receiver 302 is implemented within the display 203 having a hub system for receiving digital pixel data for display from the processor 202. Cable assembly 210a is comprised of four twisted wire pairs, with a first twisted wire pair 305a used for transmitting red pixel data from the processor 202 to display 203, a second twisted wire pair 305b used for transmitting green pixel data from the processor 202 to display 203, and a third twisted pair 305c used for transferring blue pixel data from the processor 202 to display 203. The fourth twisted wire pair 305d is used for routing a clock signal from the processor 202 to the display 203 for synchronizing the digital pixel data at the receiver 302. Further, as shown in FIG. 3 an enable signal DATA ENABLE is coupled to transmitter 301. When the DATA ENABLE signal is active, digital pixel data is actively transmitted over twisted wire differential pairs 305a–305c to display 203.

FIG. 4 illustrates a timing diagram which shows waveforms for the forward transfer of digital pixel data to the display 203. As shown in the timing diagram, when the DATA ENABLE signal is active, digital pixel data for a single line in the display is transferred to display 203 over twisted wire differential pairs 305a–305c. When the DATA ENABLE signal is inactive, no valid digital pixel data is transmitted over the twisted wire differential pairs 305a–305c. Between lines this is known as the horizontal video blanking period. Between frames this is known as the vertical video blanking period. FIG. 4 illustrates both the horizontal and vertical video blanking periods. As shown, the vertical blanking period is much longer than that horizontal video blanking period. A brief sampling of synchronization data is pulsed over all three twisted wire differential pairs 305a–305c during the horizontal and vertical video blanking periods in order to resynchronize the three color channels (red, green and blue) before digital pixel data for a next line to be displayed or a first line in a next frame is transferred. However, as shown in FIG. 4, the transmission of the synchronization data is only a small segment of the horizontal or vertical blanking period. During the remainder of the horizontal and vertical video blanking periods no data is transferred over the three twisted wire differential pairs 305a–305c.

It is understood that almost all know methods or protocols used for transferring digital pixel data to a display (such as TDMS, LVDS and analog RGB signaling) each require horizontal and vertical video blanking periods between the transmission of digital pixel data for each line in the display, or between each frame to be displayed. The length or duration of the horizontal or vertical video blanking periods may vary from system to system depending upon the type of communications protocol used and the number of pixels per line (i.e. the size or dimensions of the display). The current invention uses these video blanking periods for the bidirectional communication of digital data in a reverse direction from a display with built-in hub system to the processor.

Referring again to FIG. 3, cable assembly 210b will also include a number of wires for transferring digital data back and forth between each of the peripherals coupled to the display with built-in hub system and the processor unit. The number of wires is dependent upon the particular system configuration. For example, it is desirable to be able to transmit digital data from the digital camera to the processor, while also transmitting data from the mouse or keyboard and accordingly multiple wires are required. Accordingly, as shown in FIG. 3, the processor unit 202 further includes a receiver 310, while the display 203 with hub system includes a transmitter 315. The transmitter 315 of the display 203 with hub system routes digital information incoming from the other peripherals coupled to the display 203 to the receiver in the processor 202

While the computer system illustrated in FIG. 3 may reduce the overall number of cable assemblies coupled directly to the processor 202, it is still undesirable because it still requires a large number of wires and two different cable assemblies. Accordingly, what is needed is a simpler system for linking the processor unit with the hub system without requiring multiple cabling assemblies which also reduces the number of wires coupled to the processor, thereby reducing costs and improving the ease of use of the system.

SUMMARY OF THE INVENTION

Digital pixel data is transferred from a computer system to video display hardware in one direction using a known communications protocol such as TDMS or LVDS. However, there are many reasons for digital data to be transferred in an opposite direction from any number of peripherals to a processor in the computer system. This invention describes a method of sending digital data from any number of peripherals to a processor in a computer system in a reverse direction over a set of lines couple between the processor and a display. Transmission of video data over a set of lines coupled between the processor and the display typically requires horizontal and vertical video blanking periods during which special characters are used to resynchronize the forward transmission of a next line or a first line in a next frame of digital pixel data to a clock signal. In such a system, some or all of the forward direction data paths can be "turned around" in order to transmit digital data in a reverse direction during the horizontal and vertical video blanking periods. The beginning and end of the usable portion of the horizontal and vertical video blanking periods may be automatically programmed such that all of the lines may be used for reverse transmission of digital data, wherein the usable portion is predefined and all lines automatically switch back and forth from forward direction to reverse direction and back again at predefined times. Alternatively, one of the lines may be used to mark the usable portion of the horizontal and verical video blanking periods, wherein all other lines are "turned around" and the one line continues to transmit data in a forward direction, thereby indicating the useable portion of the horizontal and vertical video blanking periods. A separate line carrying a clock signal may be used to clock data in both directions of data transmission.

DETAILED DESCRIPTION OF PREFERRED EMBODIMENTS

In a computer system having a processor, a video display with built-in hub system, and several additional peripherals coupled to the video display with built-in hub system, digital pixel data for each line in a video display is transferred from the processor to the video display in a first direction over a series of wires or differential pairs whenever a data enable signal is active. When the data enable signal is inactive, digital pixel data for and corresponding control signals for a next line in the video display are resynchronized. This is known as a horizontal video blanking period. During this horizontal video blanking period, no valid digital pixel data is transferred over the series of wires or differential pairs. Further, between frames, the data enable signal is also inactive and digital pixel data and corresponding control signals for a first line in a new frame to be displayed are synchronized. This is known as the vertical video blanking period. The invention allows for bidirectional data transfer over the series of wires or differential pairs coupled between between the processor and the video display with built-in hub system during the horizontal and vertical video blanking periods.

In the present invention, red, green and blue digital pixel data is transferred over a plurality of wires in a first direction using a know digital communications protocol such as TDMS or LVDS. The digital pixel data is transferred from the processor to the display terminal whenever a data enable signal is active. However, when the data enable signal is inactive, then digital data may be serially transmitted in a reverse direction from the display terminal with hub system over all or some of the wires in the plurality. In this way, bidirectional data transfer is accomplished and the number of wires coupled between the processor and display terminal with hub system is reduced.

Figure 5:
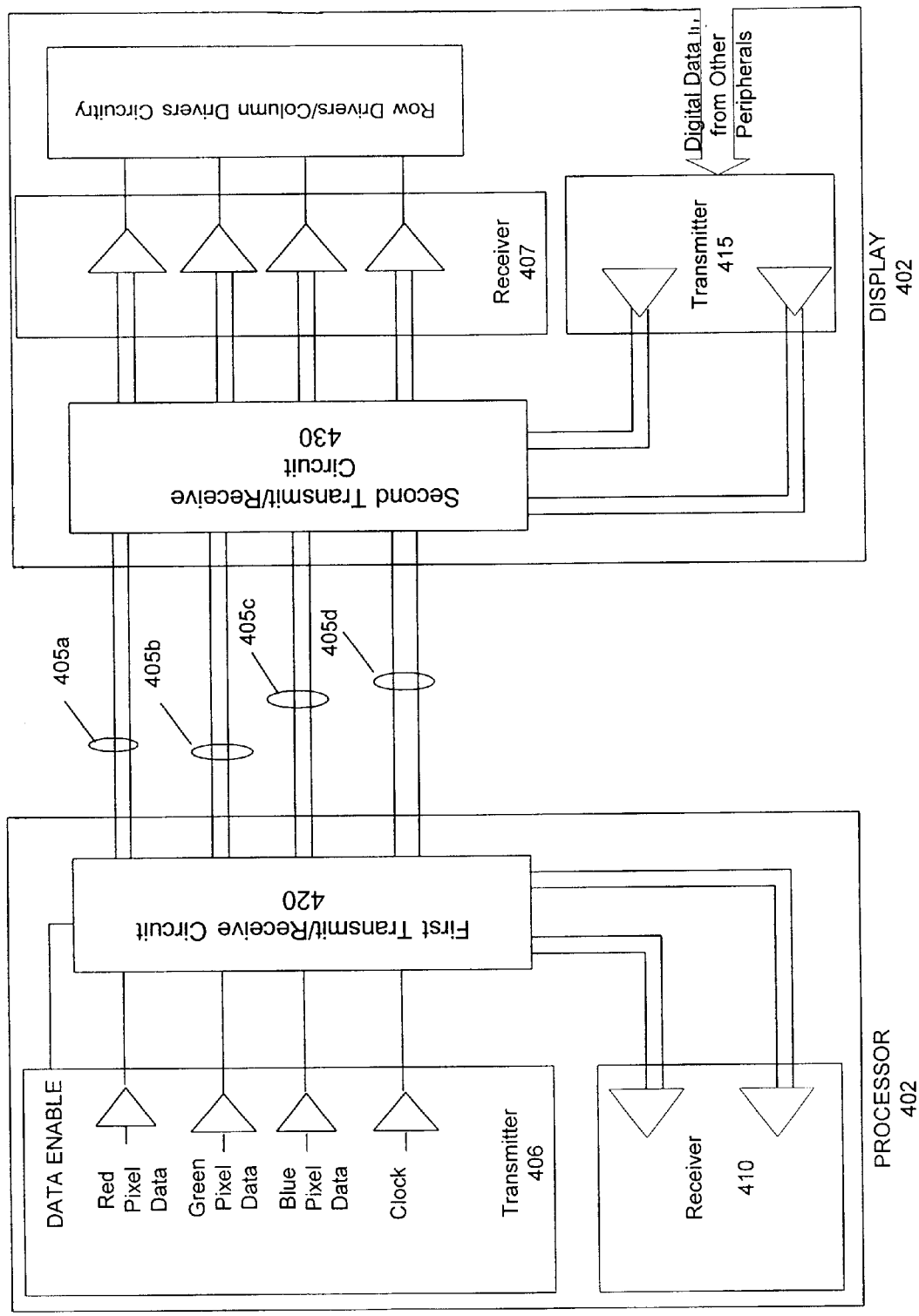
FIG. 5 illustrates a preferred embodiment of a computer system having a processor and display terminal coupled together with bi-directional data transfer over a single set of wires in accordance with the present invention.

FIG. 5 illustrates a computer system which incorporates a preferred embodiment of the bidirectional data transfer system of the present invention. In the computer system illustrated in FIG. 5, a processor 401 includes a transmitter 406, a receiver 410, and a first transmit/receive circuit 420 which is coupled to both the transmitter 406 and the receiver 410. In this preferred embodiment, a TDMS communications protocol is used to transfer digital pixel data from processor 401 to a video display terminal 402 Accordingly, the processor is coupled to a video display terminal 402 through four twisted wire pairs 405a–d. Preferably, the video display terminal 402 is an active matrix flat panel display; however, it is understood that any other video display terminal may be used in alternate embodiments, so long as the communications between the processor 401 and the display terminal 402 are in a digital format. The four twisted wire pairs 405a–d are preferably implemented within a single cable assembly.

The display terminal 402 includes a receiver 407, a transmitter 415, and a second transmit/receive circuit 430 coupled to both the receiver 407 and the transmitter 415. The second transmit/receive circuit 430 couples incoming digital pixel data to the receiver 407, which receives the incoming digital pixel data and routes the data to row and column driver circuitry within the display terminal 402. Implementation of row and column driver circuitry is well known in the art and is not an aspect of this invention. Accordingly, the display terminal 402 may embody any type of row and column driver circuitry known in the art for producing a displayed image on the display terminal 402. The transmitter 415 in the display terminal 402 receives incoming digital data from a number of peripherals which may be coupled to the display terminal 402 and transmits this digital data through the second transmit/receive circuit 430 to the processor unit 401. These peripherals may include a keyboard, a mouse, a digital camera, or a pair of audio speakers. It is understood that other peripherals may be coupled to the display terminal 402.

Figure 1:
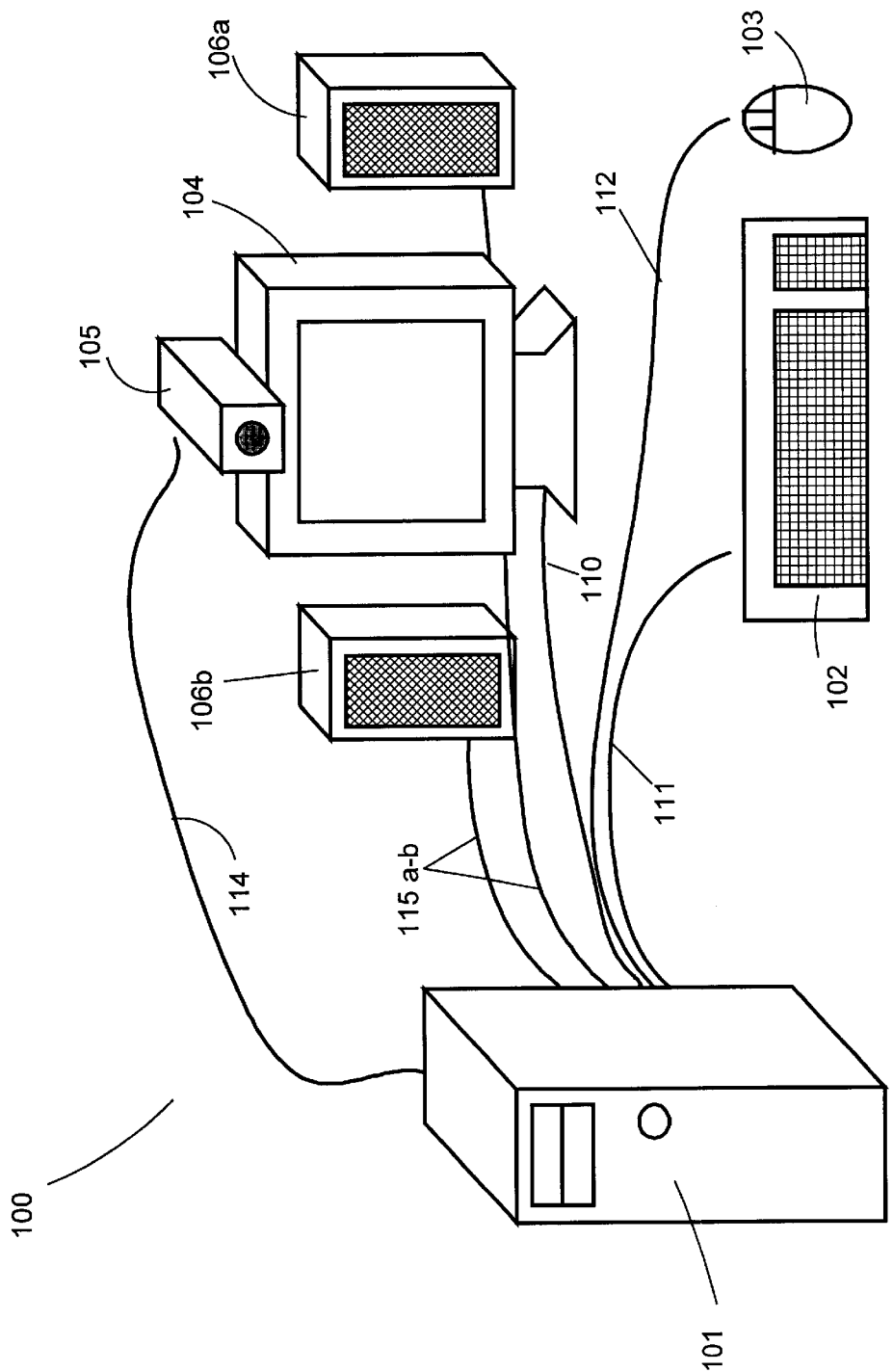
FIG. 1 illustrates a conventional computer system having a processor unit and a number of peripherals coupled to the processor.
Figure 2:
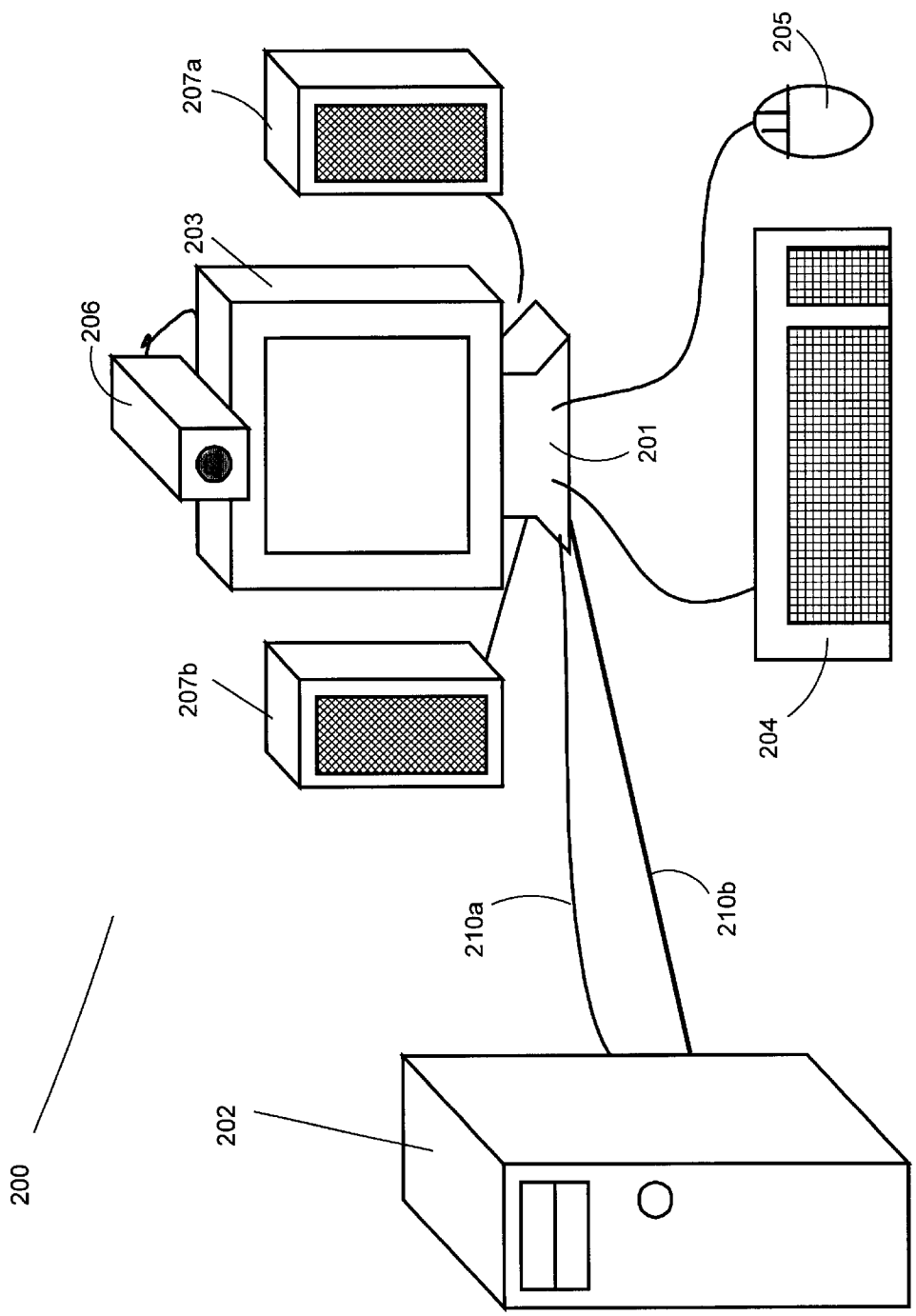
FIG. 2 illustrates a conventional embodiment of a computer system having a hub system coupled to a processor unit which utilizes two uni-directional cable assemblies for communications between the processor unit and the hub system.
Figure 3:
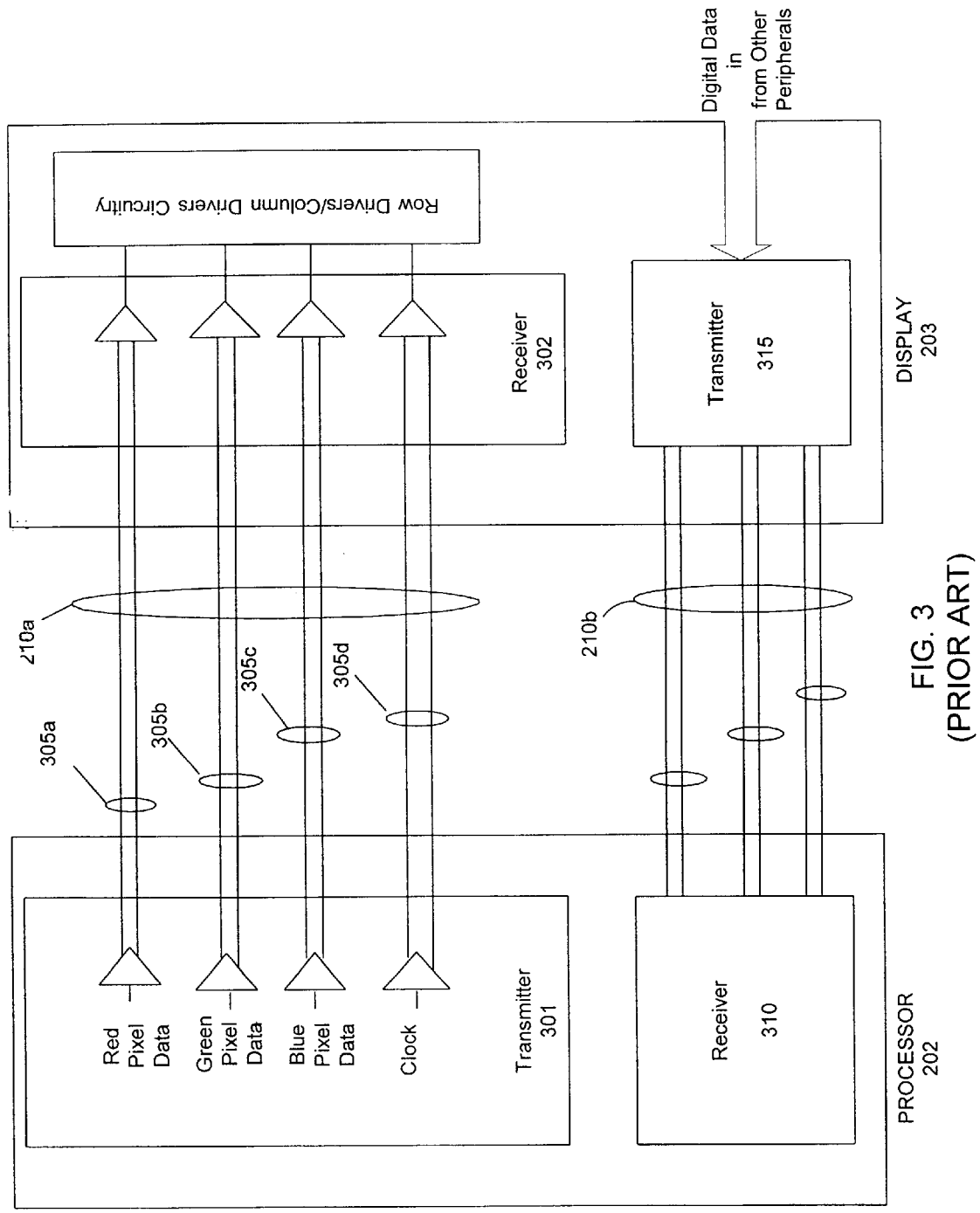
FIG. 3 illustrates a prior art system for transmitting digital pixel data in a forward direction over a first set of wires coupled between a processing unit and a display and receiving digital data in a second direction over a second set of wires coupled between the processing unit and the display.

In this way, the display terminal of FIG. 5 is similar to the display terminal illustrated in FIG. 2. However, unlike the display terminal 203 shown in FIG. 2, display terminal 402 shown in FIG. 5 is coupled to the processor 401 through a single cable assembly having four twisted wire pairs 405a–d. No additional wires or wire pairs are required to transmit digital data in a reverse direction. Instead, using the bi-directional data transfer system of the present invention, the computer system of FIG. 5 is able to transfer digital pixel data from the processor 401 to the display terminal 402 in a forward direction, and is further able to transfer digital data from any of the peripherals coupled to the display terminal 402 to the processor 301 in a reverse direction over the four twisted wire pairs 405a–d within a single cable assembly.

Preferably, in the system of FIG. 5, the processor generates digital pixel data for display on the display terminal 402 and this digital pixel data is transferred in a forward direction from the processor 401 to the display terminal 402 over three of the four wire pairs 405a, 405b and 405c whenever the data enable signal is active. In the embodiment illustrated in FIG. 5, the digital pixel data is transferred using the TDMS communications protocol. When the data enable signal is inactive, no valid digital pixel data is transferred from the processor 401 to the display terminal 402. This may occur during the horizontal video blanking period or the vertical video blanking period. During these horizontal and vertical video blanking periods, when the data enable signal is inactive, the processor resynchronizes digital pixel data and the clock signal for a next line to be displayed on the display terminal or a first line in a next frame. However, the resynchronization process requires only a fraction of the horizontal or vertical video blanking period. During the remainder of the horizontal and vertical video blanking periods, no valid data is transferred over wire pairs 405a, 405b, and 405c while the data enable signal remains inactive. It is during this extra time period that digital data may be transferred back to the processor 401 from the display terminal 402 in a reverse direction using the present invention.

As shown in the preferred embodiment illustrated in FIG. 5, the processor 401 includes a transmitter 406, a receiver 410 unit, and a first transmit/receive circuit 420 coupled to both the transmitter 406 and the receiver 410. As explained above, the display terminal 402 also includes a receiver 407, a transmitter 415, and a second transmit/receive circuit 430 coupled to both the receiver 407 and the transmitter 415. Four twisted wire pairs 405a–d are coupled between the processor and the hub system of the display terminal 402. Preferably, the four wire pairs are implemented within a single cable assembly. One twisted pair 405a is used for transmitting red digital pixel data and control signals from the processor 401 to the display terminal 402, a second twisted pair 405b used for transmitting green digital pixel data and control signals from the processor 401 to the display terminal 402, a third twisted pair 405c is used for transmitting blue digital pixel data and control signals from the processor 401 to the display terminal 402, and a fourth twisted pair 405d is used for transmitting a differential clock signal from the processor 401 to the display terminal 402.

As explained above, the red, green and blue digital pixel data is transferred from the processor to the display terminal whenever a data enable signal is active. However, when the data enable signal is inactive, the first and second twisted wire pairs 405a and 405b are used for transmitting digital data from any number of peripherals which may be coupled to the display terminal 402 to the processor 401. The third twisted wire pair is preferably used to mark the beginning and ending of that portion of the horizontal or vertical video blanking period which may be used for bidirectional data transfer.

Alternatively, all three lines may use for bidirectional data transfer. In this embodiment, the system has horizontal and vertical video blanking periods of known duration. Digital pixel data may be transferred in a reverse direction from the peripherals to the processor during the useable portion of these video blanking periods and all lines may be programmed to automatically switch back and forth from forward to reverse direction and then back again at predetermined time intervals during the horizontal and vertical video blanking periods.

FIGS. 6a–6b illustrate the transmission of digital data in a reverse direction in a first preferred embodiment of the present invention. In this first preferred embodiment, digital data is transmitted in a reverse direction over the first and second twisted wire pairs from the display terminal 402 to the processor 401, and the third twisted wire pair 405c is used to track the usable portions of the horizontal and vertical video blanking periods which may be used for transmitting digital data in a reverse direction over lines 405a and 405b. As explained earlier, when the data enable signal is inactive, digital pixel data is not transmitted from the processor 402. This occurs during the horizontal and vertical video blanking periods. During these video blanking periods, a re-synchronization pulse is preferably transmitted over all three twisted wire pairs 405a, 405b and 405c in order to forward synchronize the lines for the next transmission of digital pixel data. Once again, as shown in FIGS. 6a–6b, the re-synchronization pulse is only a fraction of the entire video blanking period whether the period is horizontal or vertical. During the remainder of the video blanking period the twisted wire pairs 405a, 405b and 405c will ordinarily remain inactive until digital pixel data for a next line or a first line in a next image to be displayed is transmitted. It is during this time that bidirectional data transfer is accomplished using the present invention.

In the preferred embodiment illustrated in FIGS. 6a–6b, during the video blanking period the first and second twisted wire pairs 405a and 405b are used for transmitting digital information from peripherals coupled to the display terminal 402 in a reverse direction to processor 401. As shown in FIGS. 6a–b, immediately following the transmission of the forward direction re-synchronization pulses over all three twisted wire pairs 405a, 405b and 405c, the processor 401 causes the first transmit/receive circuit 420 to reroute the first and second dual wire pairs 405a and 405b to the receiver 410 in processor 410. The processor 401 also transmits a start blanking pulse STARTBLANK over the third wire pair 405. FIG. 6b shows the transmission of STARTBLANK over the third dual wire pair 405c. When received at the display 402, the start blanking pulse STARTBLANK causes the second transmit/receive circuit 430 to reroute the first and second wire pairs 405a and 405b to the transmitter 415 in display 402, thereby allowing digital data to be transmitted over these two dual wire pairs 405a and 405b. Digital data may then be serially transmitted from the transmitter 415 of the display terminal 402 to the receiver 410 of the processor 401 via the first and second twisted wire pairs 405a and 405b.

As shown in FIGS. 6a and 6b, once the STARTBLANK signal is received at the display terminal 402, the display terminal 402 begins transmitting data over the first and second twisted wire pairs 405 in a reverse direction. The display terminal 402 will first transmit a synchronization pulse in the opposite direction in order to ensure synchronization at the receiver 410 in the processor 401. The transmitter 415 in the display terminal 402 then begins serially transmitting digital data in a reverse direction over the first and second twisted wires pairs 405a and 405b to the receiver 410 in the processor 401. The digital data is routed from any one of several peripherals which may be coupled to the display terminal 402.

At the end of the blanking period, the processor 401 transmits a signal indicating the end of the blanking period END BLANK over the third wire pair 405c. The first transmit/receive circuit 420 once again reroutes the first and second dual wire pairs 405a and 405b to the transmitter 406 in the processor 401 When received at the display 402, the ENDBLANK signal instructs the display terminal to stop transmitting data in the reverse direction and the second transmit/receive circuit 430 once again reroutes the first and second twisted wire pairs 405a and 405b to receiver 407 in the display terminal 402. The display terminal 402 switches into receive mode and prepares to receive the next transmission of digital pixel data over the first, second and third twisted wire pairs 405a, 405b and 405c. Accordingly, the third twisted wire pair 405c is used to signal when the blanking period begins and ends, and controls the transmission of data over the first and second twisted wire pairs 405a and 405b in the reverse direction. The transmitted clock signal provides the necessary frequency information to transmit the data in the backwards direction. In this embodiment, the backwards transmitted data has its own re-synchronization pulse which sets the phase of the data in the same way that it is for the forward direction.

In a preferred embodiment, the clock signal in the processor 401 is used to control the receipt of digital data over the two signaling lines 405a and 405b in the reverse direction, as well as control the transmission of digital information over the third line 405c in the forward direction. Alternatively, the display terminal 402 may have its own clock signal generator and one of the lines 405a or 405b may be used for transmitting a clock signal from the display 402 to processor 401 in order to transmit digital data in a reverse direction at a different clock rate.

The transmission of digital data in the reverse direction over the first and second twisted wire pairs 405a and 405b only takes place for a fraction of time. Accordingly, in a preferred embodiment, digital data which is to be transferred in the reverse direction from the display terminal to the processor is preferably gated or buffered in a first-in-first-out memory until the horizontal or vertical video blanking periods occur. This allows the digital data to be accepted at any time from the peripherals and stored in the display 402 until it can be transmitted when the reverse channels are available.

Figure 6:
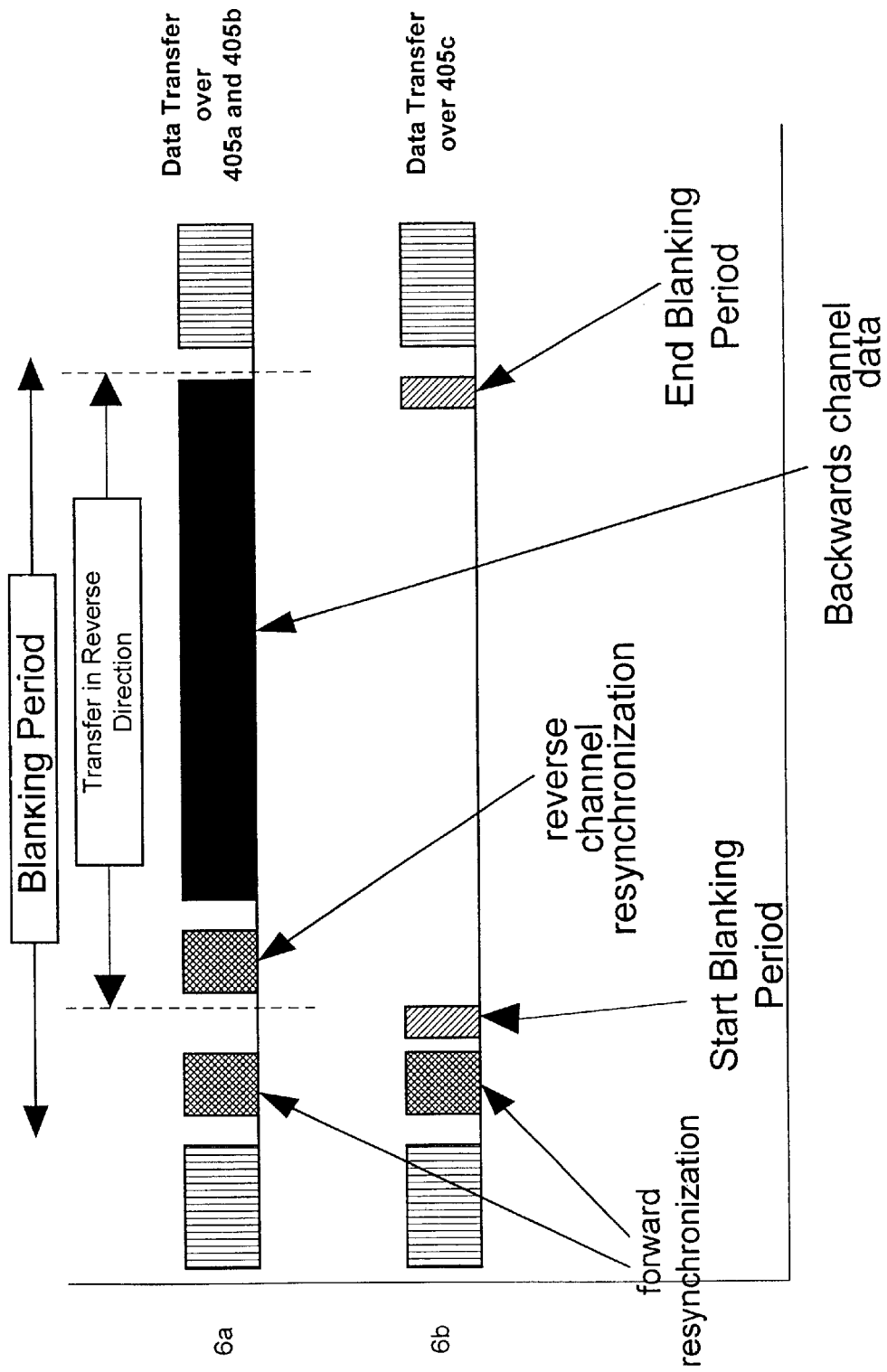
FIGS. 6a–6b illustrate waveforms showing the transmission of digital data in a reverse direction in a preferred embodiment of the present invention.

Although FIGS. 5 and 6 have described the preferred embodiment with reference to a system which uses TDMS communications and four twisted wire differential pairs, it is understood the embodiment is nearly identical in a system using LVDS and five twisted wire pairs. In such an embodiment, these wires pairs are then available for the reverse transmission with the fourth wire pair used for signaling those portions of the horizontal and vertical video blanking periods which may be used. The fifth wire pair would be used for transmitting a clock signal.

Figure 7:
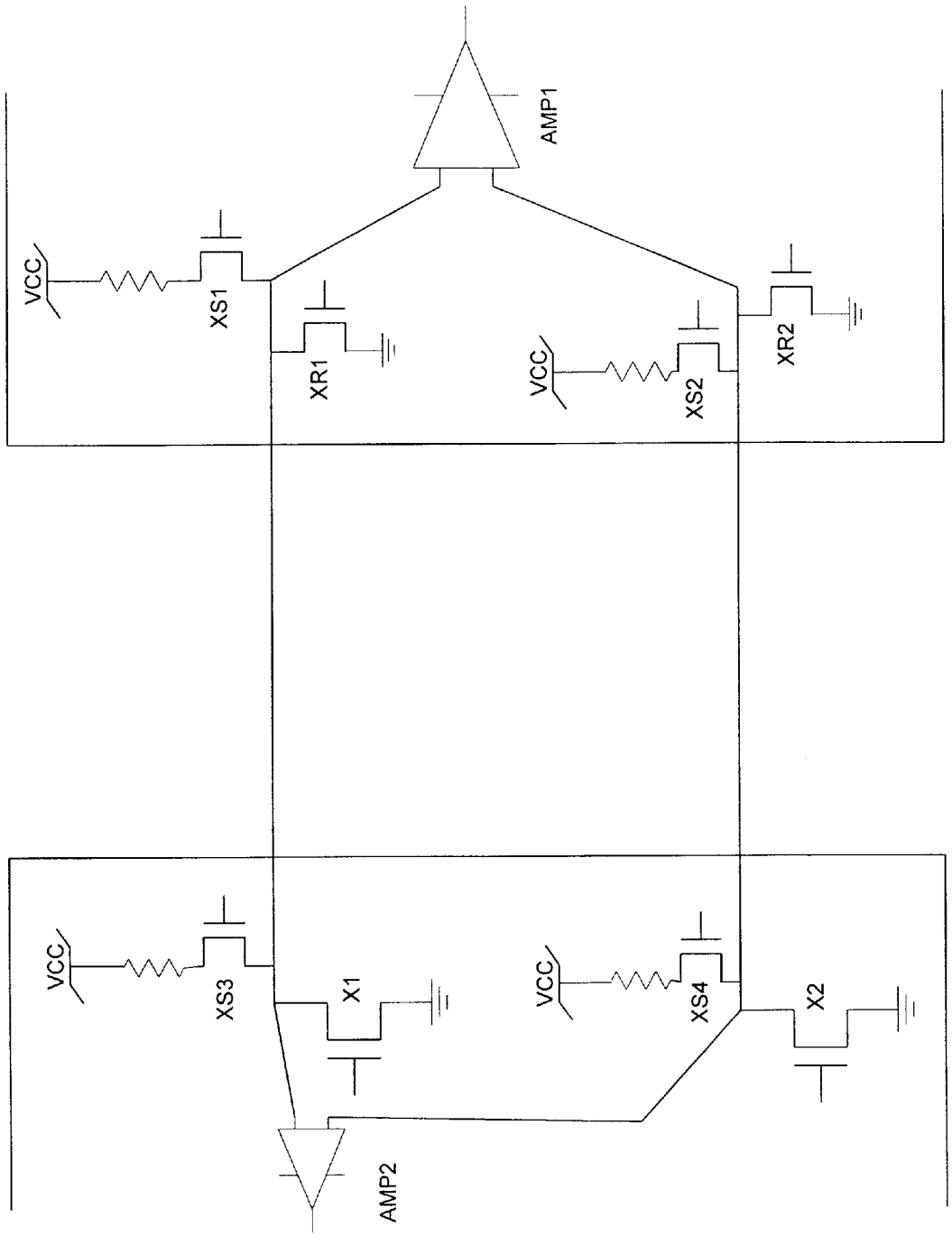
FIG. 7 illustrates an alternate embodiment for bi-directional data transfer over a single set of wires in accordance with the present invention.

FIG. 7 illustrates another preferred embodiment for implementing the present invention for convenience. For convenience, FIG. 7 illustrates the implementation over a single twisted wire pair, and it is understood that in a system utilizing TDMS communications all four twisted wire differential pairs may include the design set forth in FIG. 7 or in a system utilizing LVDS communications all five twisted wire differential pairs may include the design set forth in FIG. 7.

As shown, a twisted wire pair 700, is coupled between the processor 701 and the display with built in hub system 702 for bidirectional transfer of information. Digital pixel data is transferred in a forward direction from the processor 701 to the display with built in hub system 702 whenever a data enable signal is active. When digital pixel data is transferred in the forward direction, transistors X1 and X2 in the processor 701 are activated as digital pixel data is applied to their gates, while transistors XS3 and XS4 remain inactive. Transistors XS1 and XS2 in the display are also activated, while transistors XR1 and XR2 are inactive. As the transistors X1 and X2 in the processor 701 are activated, the voltages at the inputs to the amplifier AMP1 in the display with built in hub system 702 are modulated and the output from the amplifier AMP1 reflects the changes in digital pixel data applied to the gates of transistors X1 and X2.

During the horizontal or vertical video blanking periods, after the synchronization pulse has been transmitted, the transistors X1 and X2 in the processor 701 are turned off and the transistors XS3 and XS4 in the processor are turned on. On the display 702 side, the transistors XS1 and XS2 are each turned off, while the transistors XR1 and XR2 are activated as digital pixel data received from peripherals coupled to the hub system of the display 702 is applied to their gates. As the transistors XR1 and XR2 in the processor 701 are activated with digital pixel data, the voltages at the inputs to the amplifier AMP2 in the processor 702 are modulated and the output from the amplifier AMP2 reflects the changes in digital pixel data applied to the gates of transistors XR1 and XR2. Digital data is thus transmitted in a reverse direction over the twisted wire differential pair until the end of the horizontal or vertical video blanking period. It is understood, that alternate embodiments may exist for transferring digital data in a reverse direction.

Figure 4:
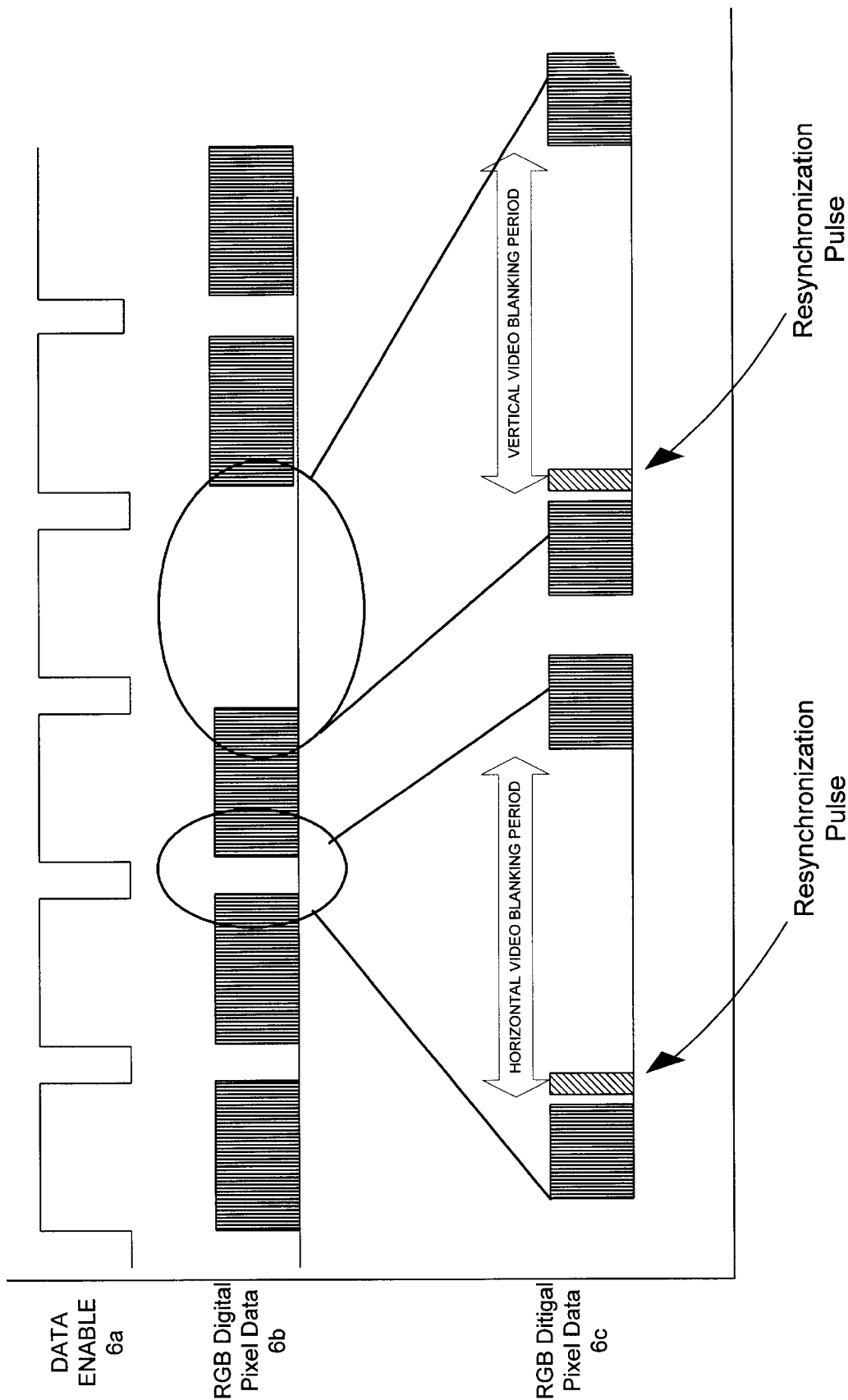
FIG. 4 illustrates a timing diagram which shows waveforms for the conventional forward direction transfer of digital pixel data to a display.
Figure 8:
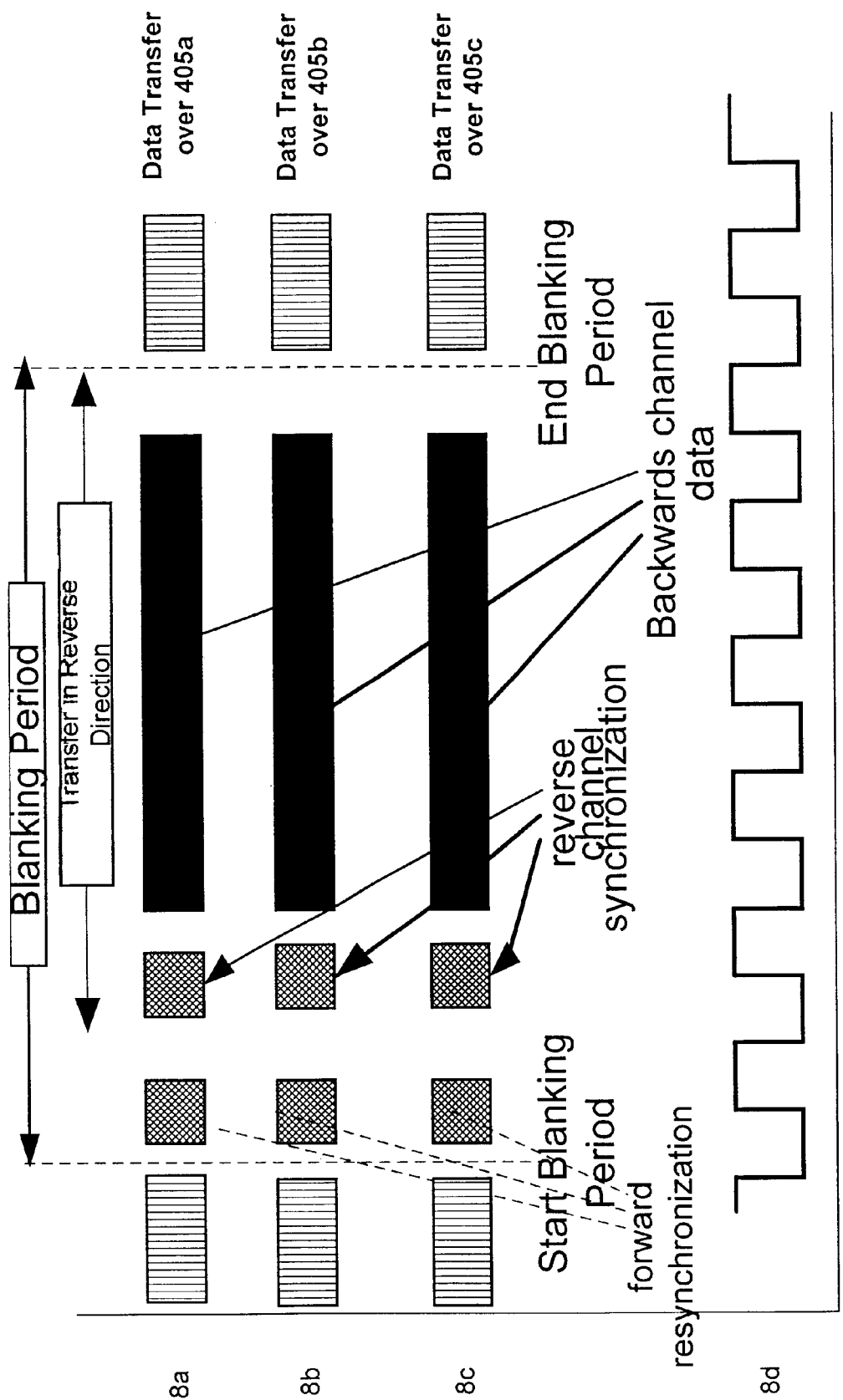
FIGS. 8a–8c illustrate waveforms showing the transmission of digital data in a reverse direction in an alternate embodiment of the present invention.

FIGS. 8a–8c; illustrate a preferred embodiment wherein digital data may be transferred in a reverse direction from the transmitter 415 in the display 402 to the receiver 410 in the processor 401. In this embodiment, the start and stop times of the switching are predetermined and last for a predetermined number of clock cycles. The structure of this embodiment may be identical to that shown in FIG. 5 or FIG. 7, except that in this particular embodiment, all three data lines 405a–c in a TDMS system (or all four data lines in a LVDS system) can switch orientation for a predetermined length of time. In order for all the data lines to be used for transmitting digital data in a reverse direction, the receiver 407 in the display 402 will include a counter which is coupled to the incoming clock signal from the dedicated clock line (line 405d in FIG. 4). This counter keeps track of the number of clock pulses which are transmitted over the dedicated clock line. In this embodiment the horizontal and video blanking periods are each of a known duration or length of time (which is measured in clock pulses) and transfer of digital data in a reverse direction is controlled by the clock signal.

Immediately following the transmission of the forward synchronization pulse from the transmitter the processor 401 reroutes all three of the dual wire pairs 405a–c to the receiver 410. The forward synchronization pulse is then received at the receiver 407 in display 402. Immediately following receipt of the synchronization pulse, the display 402, reroutes all three twisted wire pairs 405a–c to the transmitter 415 and the reverse transmission of digital data can ensue. Preferably, a reverse synchronization pulse will be translated over each line to ensure synchronization of received data with the clock in the processor 401.

In the preferred embodiment illustrated in FIGS. 8a–8c, the horizontal and vertical video blanking periods last for a predetermined number of clock periods and the display 402 includes a counter for tracking the number of clock signals received.

FIG. 8d shows the clock pulse which is transmitted from the processor 401 to the display 402 over a separate line. When last clock signal in the video blanking period is received the transmitter 415 in the display 402 stops transmitting digital data in a reverse direction and the display 402 reroutes the three signal lines 405a–c to the receiver 407 in display 402. Accordingly, FIGS. 8a–d illustrate that on the rising edge of the last clock pulse in transmitted during the video blanking period (horizontal or vertial) the data transmission in the reverse direction stops over all three data lines. The processor then automatically reroutes the data lines 405a–c to the transmitter 406 in the processor 401, and the processor 402 will begin to transmit digital pixel data for a next line, or a first line in a next frame, to the display 402.

Although digital data is only transmitted in a reverse direction during the video blanking period, the transmission rate and the number of blanking periods per second allow for most applications. In a preferred embodiment, the data rate for an XGA (1024×768) display at 24 bits per pixel (8 bits per red, green and blue subpixels) and 60 Hz refresh is 142 MBytes per second. Accordingly, if the horizontal and vertical blanking periods are used for transmitting digital data in the reverse direction (with approximately 10% of the blanking period used for overhead to switch data flow direction) then a reverse data rate of 21 Mbytes per second can be achieved.

What is claimed is:

1. A method for communicating bi-directionally between a processor, a video display monitor, and at least one peripheral coupled to the video display monitor comprising the steps of:

transmitting a first row of digital pixel data from the processor to the video display monitor in a first direction over a plurality of signaling lines when a data enable signal is in a first state;

transmitting digital data from the at least one peripheral to the processor in a second direction over at least one of the plurality of signaling lines when the data enable signal is in a second state, and transmitting a second row of digital pixel data from the processor to the video display monitor in the first direction over the plurality of signaling lines when the data enable signal returns to the first state.

2. The method of claim 1, wherein the plurality of signaling lines includes a first line for transmitting red digital pixel data in the first direction, a second line for transmitting green digital pixel data in the first direction, a third line for transmitting blue digital pixel data in the first direction and a fourth line for transmitting a first clock signal in the first direction, and further wherein the first and second lines are used for transmitting digital data from the at least one peripheral to the processor in the second direction when the data enable signal is in the second state.

3. The method of claim 2 wherein the third line is used to control the transmission of digital data from the at least one peripheral to the processor in the second direction when the data enable signal is in the second state.

4. The method of claim 1, wherein the plurality of signaling lines includes a first line for transmitting red digital pixel data in the first direction, a second line for transmitting green digital pixel data in the first direction, a third line for transmitting blue digital pixel data in the first direction and a fourth line for transmitting a first clock signal in the first direction, and further wherein the first, second, and third lines are used for transmitting digital data from the at least one peripheral to the processor in the second direction when the data enable signal is in the second state.

5. The method of claim 2 wherein the fourth line is used to control the transmission of digital data from the at least one peripheral to the processor in the second direction when the data enable signal is in the second state.

6. The method of claim 2 wherein the number of clock pulses transmitted over the fourth line is used to control the transmission of digital data from the at least one peripheral to the processor in the second direction when the data enable signal is in the second state.

7. A system for communicating bi-directionally between a processor and a video display monitor comprising:
   a transmitting unit within the processor for transmitting digital pixel data from the processor to the video display monitor in a first direction over a plurality of signaling lines, wherein the digital pixel data is transmitted from the processor to the video display monitor whenever a data enable signal is in a first state,
   a receiving unit within the processor for receiving digital data transmitted from a peripheral coupled to the display monitor in a second direction over at least one of the plurality of signaling lines, wherein the digital data it transmitted from the video display monitor to the processor when the data enable signal is in a second state, and the first and second states are enabled for each row of digital data transmitted.

8. The system of claim 7, further comprising:
   a receiver within the display monitor for receiving digital pixel data transmitted from the processor to the video display monitor in the first direction over the plurality of signaling lines; and
   a transmitter within the display monitor processor for transmitting digital data received from the peripheral coupled to the display monitor in a second direction over at least one of the plurality of signaling lines when the data enable signal is in a second state.

9. The system of claim 8 further comprising:
   a first switching network coupled between the transmitting unit and the receiving unit in the processor for switching operations between the transmission of digital pixel data to the display monitor and the reception of digital data from the display monitor; and
   a second switching network coupled between the transmitter and the receiver in the display monitor for switching operations between the reception of digital pixel data from the processor and the transmission of digital data to the processor.

10. The system of claim 9, wherein the plurality of signaling lines includes a first line for transmitting red digital pixel data in the first direction, a second line for transmitting green digital pixel data in the first direction, a third line for transmitting blue digital pixel data in the first direction and a fourth line for transmitting a first clock signal in the first direction, and further wherein the first and second lines are used for transmitting digital data from the display monitor to the processor in the second direction when the data enable signal is in the second state.

11. The system of claim 10, wherein the third line is used to control the first and second switching networks.

12. The system of claim 9, wherein the plurality of signaling lines includes a first line for transmitting red digital pixel data in the first direction, a second line for transmitting green digital pixel data in the first direction, a third line for transmitting blue digital pixel data in the first direction and a fourth line for transmitting a first clock signal in the first direction, and further wherein the first, second, and third lines are used for transmitting digital data from the at least one peripheral to the processor in the second direction when the data enable signal is in the second state.

13. The system of claim 12, wherein the fourth line is used to control the first and second switching networks.

14. The method of claim 12 wherein the number of clock pulses transmitted over the fourth line is used to control the transmission of digital data from the at least one peripheral to the processor in the second direction when the data enable signal is in the second state.

15. The system of claim 9, wherein the plurality of signaling lines includes four differential pairs which are used for transmitting red, green and blue digital pixel data in the first direction and a fifth differential pair for transmitting a first clock signal in the first direction, and further wherein the four differential pairs are used for transmitting digital data from the at least one peripheral to the processor in the second direction when the data enable signal is in the second state.

16. The system of claim 15 wherein the first clock signal is used to control the first and second switching networks.

17. The system of claim 16 wherein the number of clock pulses transmitted over the fifth differential pair in the first direction is used to control the transmission of digital data from the at least one peripheral to the processor in the second direction when the data enable signal is in the second state.

18. The system of claim 9, wherein the plurality of signaling lines includes four differential pairs which are used for transmitting red, green and blue digital pixel data in the first direction, and further wherein the three of the four differential pairs are used for transmitting digital data from the display monitor to the processor in the second direction when the data enable signal is in the second state.

19. The system of claim 10, wherein the fourth differential pair is used to control the switching networks.

20. A system for bi-directionally transferring digital data to the from a video display monitor, comprising:
   a processor for transmitting digital pixel data to the video display monitor in a first direction over a plurality of signaling lines, wherein the digital pixel data is transmitted from the processor to the video display monitor whenever a data enable signal is in a first state, and receiving digital data transmitted from the display monitor in a second direction over at least one of the plurality of signaling lines, wherein the digital data it transmitted from the video display monitor to the processor when the data enable signal is in a second state, and the first and second states are enabled for each row of digital pixel data transmitted.

21. The system of claim 20 wherein the display monitor includes a built-in hub system for coupling to at least one peripheral, wherein the hub system receives the digital data from the at least one peripherals and transmits the received digital data from the display monitor in a second direction over at least one of the plurality of signaling lines to the processor when the data enable signal is in a second state.

22. A computer program product comprising:

a computer useable medium having computer readable code embodied therein for a bi-directionally transferring data back and four between a processor and a video display terminal, the computer readable code causing the processor to:

generate a data enable signal capable of being in either a first state or a second state;

transmit digital pixel data over a plurality of signal lines in a first direction toward the video display terminal if the data enable signal is in the first state;

receive digital data over the plurality of signal lines in a second direction from the video display terminal if the data enable signal is in the second state; and enable the first and second states for every row of digital pixel data.

23. The computer program product of claim 22, wherein the computer readable code further causes the processor to:

transmit a clock signal over a dedicated line in the first direction toward the video display terminal.

* * * * *